(12) United States Patent
Lake

(10) Patent No.: US 7,244,173 B2
(45) Date of Patent: Jul. 17, 2007

(54) ANIMAL SKINNER AND METHOD OF USE

(76) Inventor: Gregory P. Lake, 2840 Fox Run Cir., Green Bay, WI (US) 54302

( * ) Notice: Subject to any disclaimer, the term of this patent is extended or adjusted under 35 U.S.C. 154(b) by 0 days.

(21) Appl. No.: 10/741,818

(22) Filed: Dec. 19, 2003

(65) Prior Publication Data
US 2005/0136816 A1 Jun. 23, 2005

(51) Int. Cl.
*A22B 5/16* (2006.01)
(52) U.S. Cl. .................................................. 452/128
(58) Field of Classification Search ............... 294/142; 254/283, 284; 452/128, 185, 187, 189, 190
See application file for complete search history.

(56) References Cited

U.S. PATENT DOCUMENTS

| | | |
|---|---|---|
| 192,723 A | 7/1877 | Wheeler |
| 458,018 A | 8/1891 | Curtis |
| 708,608 A | 9/1902 | Zander |
| 892,719 A | 7/1908 | Gratton |
| 940,434 A | 11/1909 | Coultas |
| 957,344 A | 5/1910 | Kaiserlik |
| 1,020,843 A | 3/1912 | Peterson |
| 1,033,223 A | 7/1912 | Wilson |
| 1,085,439 A | 1/1914 | Knudson |
| 1,117,436 A | 11/1914 | Person |
| 1,530,675 A | 3/1925 | James |
| 2,710,766 A | 6/1955 | Erlewine |
| 2,867,402 A | 1/1959 | Graybill et al. |
| 3,209,395 A | 10/1965 | Jones et al. |
| 3,404,431 A | 10/1968 | Knauss |
| 3,854,168 A * | 12/1974 | Bradley ..................... 452/189 |
| 3,871,084 A | 3/1975 | Carrington et al. |
| 3,894,313 A | 7/1975 | Miller |
| 4,021,884 A | 5/1977 | Saltykov et al. |
| 4,027,357 A | 6/1977 | Morris |
| 4,338,703 A | 7/1982 | Tanner |
| 4,751,768 A | 6/1988 | Trujillo, Sr. |
| 4,806,063 A * | 2/1989 | York ........................ 414/462 |
| 4,860,404 A * | 8/1989 | Flachs ....................... 452/187 |
| 4,903,372 A * | 2/1990 | Jones ....................... 452/187 |
| 4,909,555 A | 3/1990 | Blasi |
| D312,388 S | 11/1990 | Riener |
| D315,092 S | 3/1991 | Brown |
| 5,049,110 A | 9/1991 | Owens |
| 5,211,601 A * | 5/1993 | Cope ....................... 452/187 |
| 5,263,675 A | 11/1993 | Roberts et al. |
| 5,288,265 A | 2/1994 | Beason et al. |
| 5,304,091 A | 4/1994 | Wilkinson |
| 5,336,124 A | 8/1994 | Garside |
| 5,395,284 A | 3/1995 | Frisk |
| 5,417,609 A | 5/1995 | Oldham |

(Continued)

*Primary Examiner*—Thomas Price
(74) *Attorney, Agent, or Firm*—Brian G Gilpin; Godfrey & Kahn SC

(57) ABSTRACT

An animal skinner with a base attached to a support having an arm and a crank positioned thereon. A skin retainer is positioned on the base. A hang line is engaged to the crank at one end, travels through a hang line guide attached to the arm, and is engaged to an animal fastener at the other end. The animal skinner is attached to a brace. In operation, an animal is attached to the animal fastener. The animal's skin is positioned in the skin retainer. The crank is operated, hoisting the animal and pulling it out of its skin.

13 Claims, 9 Drawing Sheets

U.S. PATENT DOCUMENTS

| | | | |
|---|---|---|---|
| 5,562,534 A * | 10/1996 | McGough | 452/187 |
| 5,588,907 A | 12/1996 | DePietro et al. | |
| 5,591,077 A | 1/1997 | Rowe | |
| 5,791,858 A | 8/1998 | Sasser | |
| 5,820,455 A | 10/1998 | Breedlove | |
| 5,873,776 A | 2/1999 | Klepac | |
| 6,062,974 A | 5/2000 | Williams | |
| 6,109,855 A | 8/2000 | Vela-Cuellar | |
| 6,250,483 B1 | 6/2001 | Frommer | |
| 6,296,559 B1 * | 10/2001 | Kinnebrew | 452/128 |
| D462,416 S | 9/2002 | Dallas, Sr. | |
| 2002/0164940 A1 | 11/2002 | Maxwell | |
| 2002/0173262 A1 | 11/2002 | Stiefel | |

* cited by examiner

ANIMAL SKINNER AND METHOD OF USE

BACKGROUND OF THE INVENTION

This invention relates generally to an apparatus for removing the skin from an animal carcass and methods of skinning an animal. In particular, the invention relates to a transportable apparatus having a relatively small footprint that is attached to a support and methods of using the same.

Animals provide a valuable food source for people. The vast majority of the edible portion of an animal consists of muscle tissue that is typically covered by skin or hide. As such, an animal's skin is usually removed before the muscle tissue can be accessed. In removing the skin of an animal, commonly referred to as skinning, it is highly desirable to prevent the outside layer of the skin from contacting the inside flesh and muscle layer, or meat of the animal. The outside skin of the animal may contain parasites or other contaminates found on animals in the wild. Contact between the outside skin and meat of an animal may result in contamination of the meat.

People have developed numerous devices and methods for safely removing skin from animals ranging from hand-held tools to large industrial machines. One type of animal skinning apparatus provides for a transportable device that can be used in connection with hunting. Many types of game are hunted including without limitation deer, antelope, raccoons, and bears. Often times these animals are rather large. Hunters typically travel into rather uninhabited areas to hunt. These areas provide limited access, requiring the hunter to travel by foot or small vehicle such as an All Terrain Vehicle. In such situations, hunters face difficulties in removing whole game felled during a hunt. Other times, hunters may be able to remove whole game but wish to skin and butcher the game themselves. Many devices exist to assist hunters in skinning and butchering game. Specifically, many attempts have been made to design a transportable, winch based device where an animal's skin is attached to a fixed point and the animal is hoisted up, thereby pulling the animal out of its skin.

One form of this type of animal skinner utilizes an electrically powered winch to hoist the animal. For example, U.S. Pat. No. 6,296,559 to Kinnebrew discloses an apparatus having a large base, a pair of support or frame members, a carcass hanger, an electrically powered winch, and skin retaining clamps. The winch is directly connected to the carcass hanger and is powered by an outlet or a battery. This apparatus contains integrated electrical and mechanical parts and multiple support portions.

Another form of this type of animal skinner is self-supporting. For example, U.S. Pat. No. 5,211,601 to Cope discloses an apparatus with a base that extends outward from the main portion of the apparatus. The apparatus is angled so that the base supports the weight of the apparatus and an animal attached thereto. This apparatus has a relatively large base and fills a considerable area.

The current hoist animal skinners suffer from certain drawbacks and limitations. Accordingly, a need exists for a hoist animal skinner that is easily transportable, relatively inexpensive to manufacture, relatively compact, and solves other problems associated with the existing animal skinners. Of course, the present invention may be used in a multitude of situations where similar performance capabilities are required.

SUMMARY OF THE INVENTION

The present invention provides for an animal skinner that is designed and used to hoist an animal while a portion of its skin is retained in a stationary position. The result is that the animal is pulled out of its skin.

In one embodiment, the animal skinner has a base connected to a support having an arm. At least one skin retainer is positioned on the base. A crank is attached to the support. A hang line guide is positioned on the arm. A hang line is connected to the crank at one end, travels through the hang line guide, and is connected to an animal fastener or a gambrel at the other end. In one embodiment, the animal skinner is attached to a brace via an attachment linkage. The attachment linkage connects the brace to an attachment point on the animal skinner.

In one method of operation, the animal skinner is attached to a brace. An animal is partially skinned so that a portion of its skin is free from the animal. The animal is attached to the animal fastener. The animal may be partially skinned before or after being attached to the animal fastener. The free portion of the animal's skin is positioned in the skin retainer. The crank is operated. Operation of the crank hoists the animal while the free portion of the skin remains positioned in the skin retainer. The result is that the animal is essentially pulled out of its skin.

The terms "support," "section," "base," "arm," "attachment point," "attachment linkage," "animal fastener," "gambrel," "hang line," "hang line guide," "brace," or "crank" as used herein should not be interpreted as being limited to specific forms, shapes, numbers or compositions of a support, section, base, arm, attachment point, attachment linkage, animal fastener, gambrel, hang line, hang line guide, brace, or crank. Rather, the support, section, base, arm, attachment point, attachment linkage, animal fastener, gambrel, hang line, hang line guide, brace, and crank may have a wide variety of shapes and forms, may vary in number, and may be composed of a wide variety of materials. Likewise, the term "animal" as used herein, and an "animal" as depicted in the figures, should not be interpreted as being limited to a specific type of animal. Rather, the present invention may be used to skin a variety of animals, including but not limited to deer, raccoon, antelope, and bears.

One possible application of the present invention is in connection with skinning animals, many other applications are possible and references to use as an animal skinner should not be deemed to limit the uses of the present invention. While certain embodiments are discussed herein, they should not be interpreted as being the only embodiments of the present invention and other embodiments may be created without departing from the present invention. These and other objects and advantages of the present invention will become apparent from the detailed description, claims, and accompanying drawings.

DETAILED DESCRIPTION OF THE PREFERRED EMBODIMENTS

Figure 1:
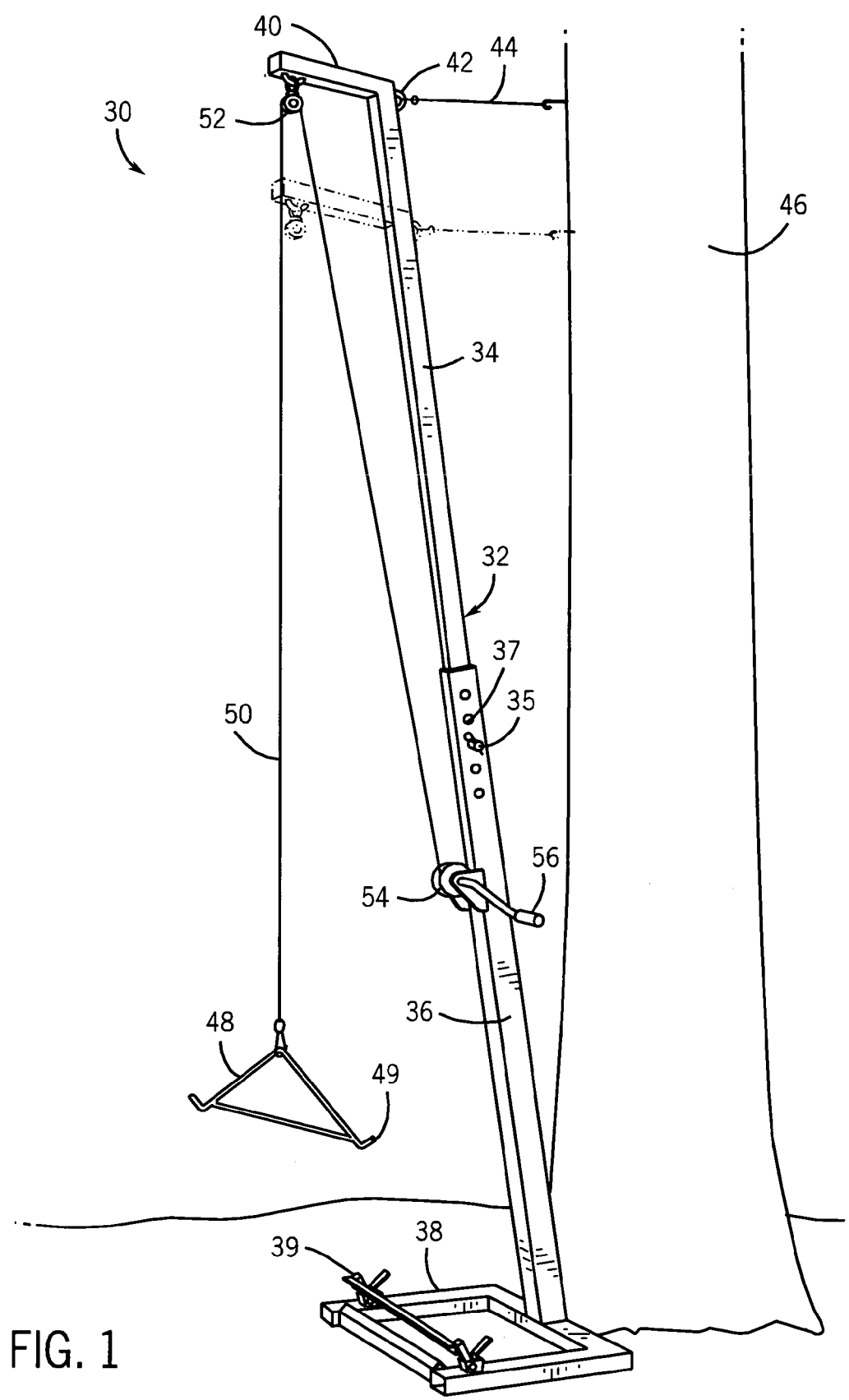
FIG. 1 is a perspective view of an animal skinner in accordance with one embodiment of the present invention, with a second position for the support of the animal skinner shown in phantom.

Illustrative embodiments of an animal skinner (identified generally as 30) in accordance with the present invention are shown in FIGS. 1 through 10. While the invention may be susceptible to embodiment in different forms, there are shown in the drawings, and herein are described in detail, certain illustrative embodiments with the understanding that the present disclosure is to be considered an exemplification of the principles of the invention, and is not intended to limit the invention to those specific embodiments illustrated and described herein. Additionally, features illustrated and described with respect to one embodiment could be used in connection with other embodiments.

The animal skinner 30 of the present invention is capable of skinning a variety of animals. In general, the animal skinner 30 is designed and used to hoist an animal 58 while a portion of its skin 60 is retained in a stationary position. The result is that the animal 58 is pulled out of its skin 60.

In the embodiment shown in FIGS. 1-10, the animal skinner 30 has a base 38 attached to a support 32 having an arm 40. At least one skin retainer 39 is positioned on the base 38. A crank 54 is attached to the upper section 34 of the support 32. A hang line 50 is functionally engaged to the crank 54 at one end and travels through a hang line guide 52 attached to the arm 40 of the support 32. The other end of the hang line 50 is engaged to an animal fastener 48, such as the gambrel shown in the illustrations. In one embodiment, animal skinner 30 is attached to a brace 46 via an attachment linkage 44. The attachment linkage 44 connects the brace 46 to an attachment point 42 on the animal skinner 30.

Figure 5:
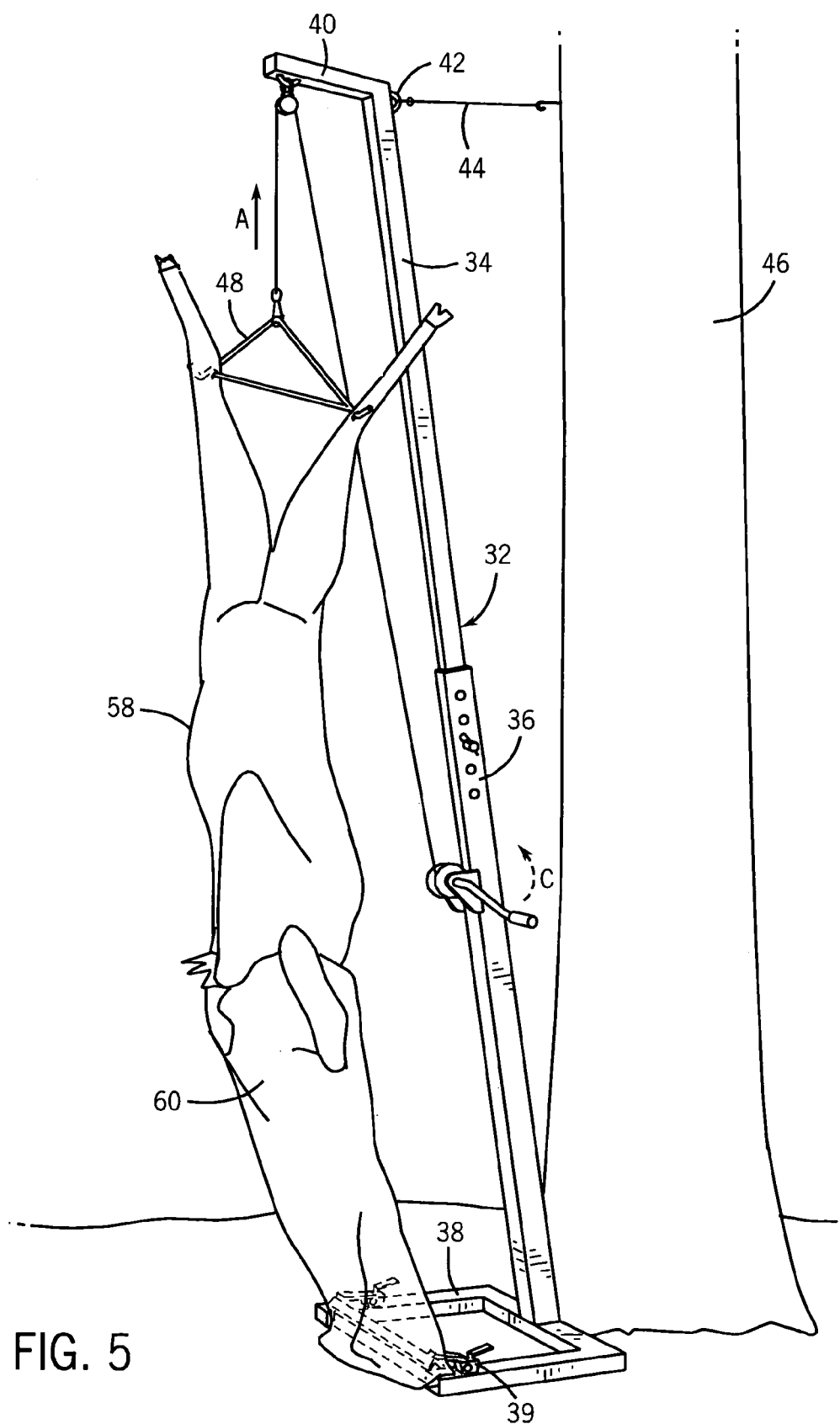
FIG. 5 is a perspective view of the animal skinner of FIG. 1 shown with a partially skinned animal attached thereto.

In operation, an animal 58 is attached to the animal fastener 48. A portion of the animal's skin 60 is positioned in the skin retainer 39. The crank 54 is operated. As shown in FIG. 5, operation of the crank 54 winds the hang line 50 around a portion of the crank 54, thereby raising the animal fastener 48 and the animal 58 in direction A. The skin 60 remains positioned in the skin retainer 39. The result is that the animal 58 is pulled out of its skin 60.

As shown in FIG. 1, the animal skinner 30 has a base 38. The base 38 may be constructed from any material such as plastic, wood, or metal and may be any shape such as rectangular, square, oval, or triangular. In one embodiment shown in FIGS. 1 and 2, the base 38 has a relatively small foot print and covers a relatively small area. In this embodiment, the base 38 is less than about two feet long.

Figure 4:
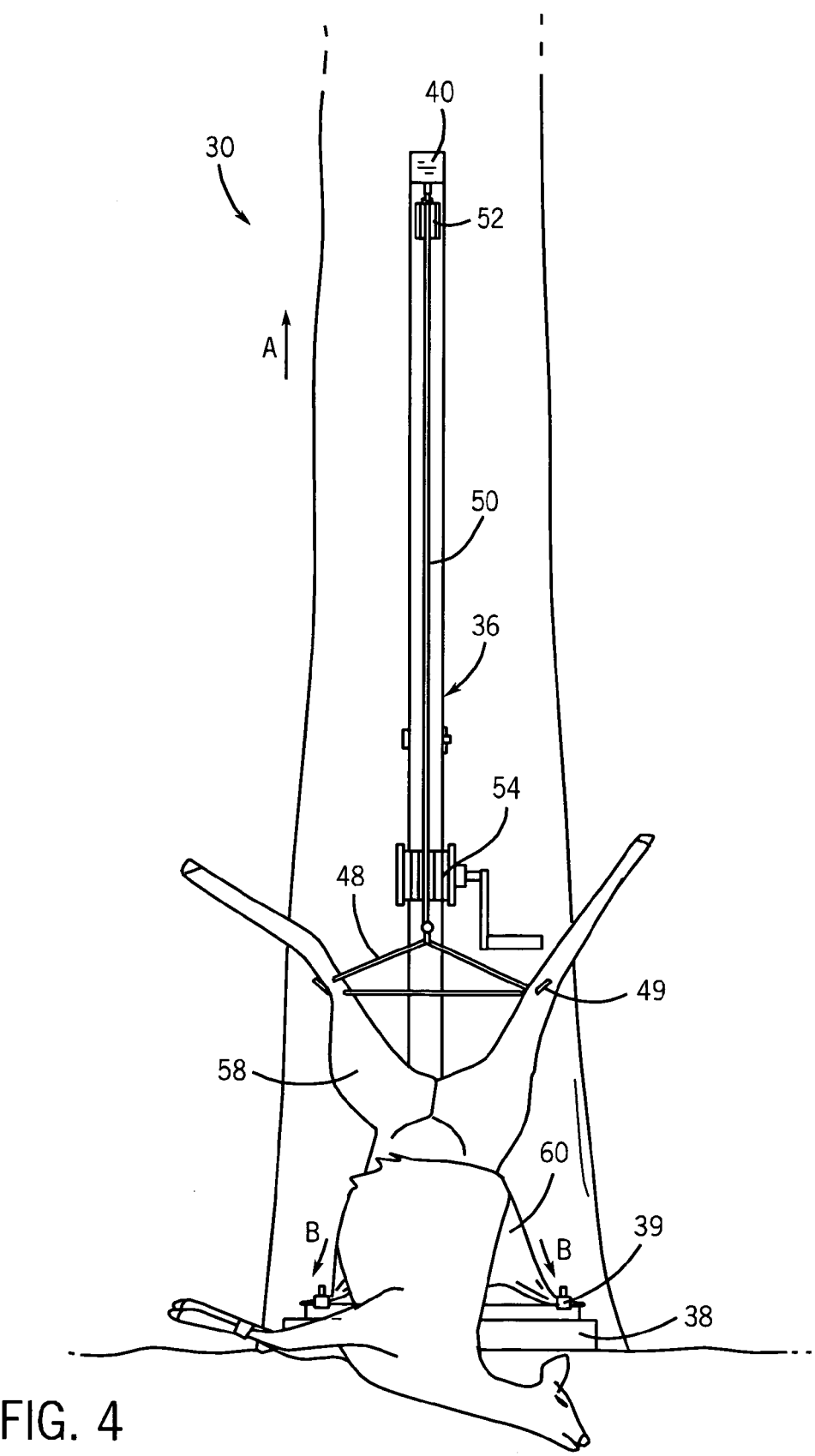
FIG. 4 is a front view of the animal skinner of FIG. 1 shown with a partially skinned animal attached thereto.

Regardless of the construction and shape, the base 38 has at least one skin retainer 39 positioned thereon. The skin retainer 39 may be a separate piece, attached to the base 38, or may be formed as part of the base 38. As discussed above and shown in FIGS. 4, 7, and 9, a portion of an animal's skin 60 is positioned in the skin retainer 39. The skin retainer 39 can be any structure able to securely hold the skin 60 while the animal 58 is hoisted in direction A as shown in FIGS. 4 and 5. The skin retainer 39 may be a single or plurality of clamps, hooks, loops, or screws. In one embodiment, the skin retainer 39 is a crank whereby the skin 58 may be pulled from the animal 58 either while the animal 58 is held in place in the animal skinner 30 or is being hoisted.

Figure 7:
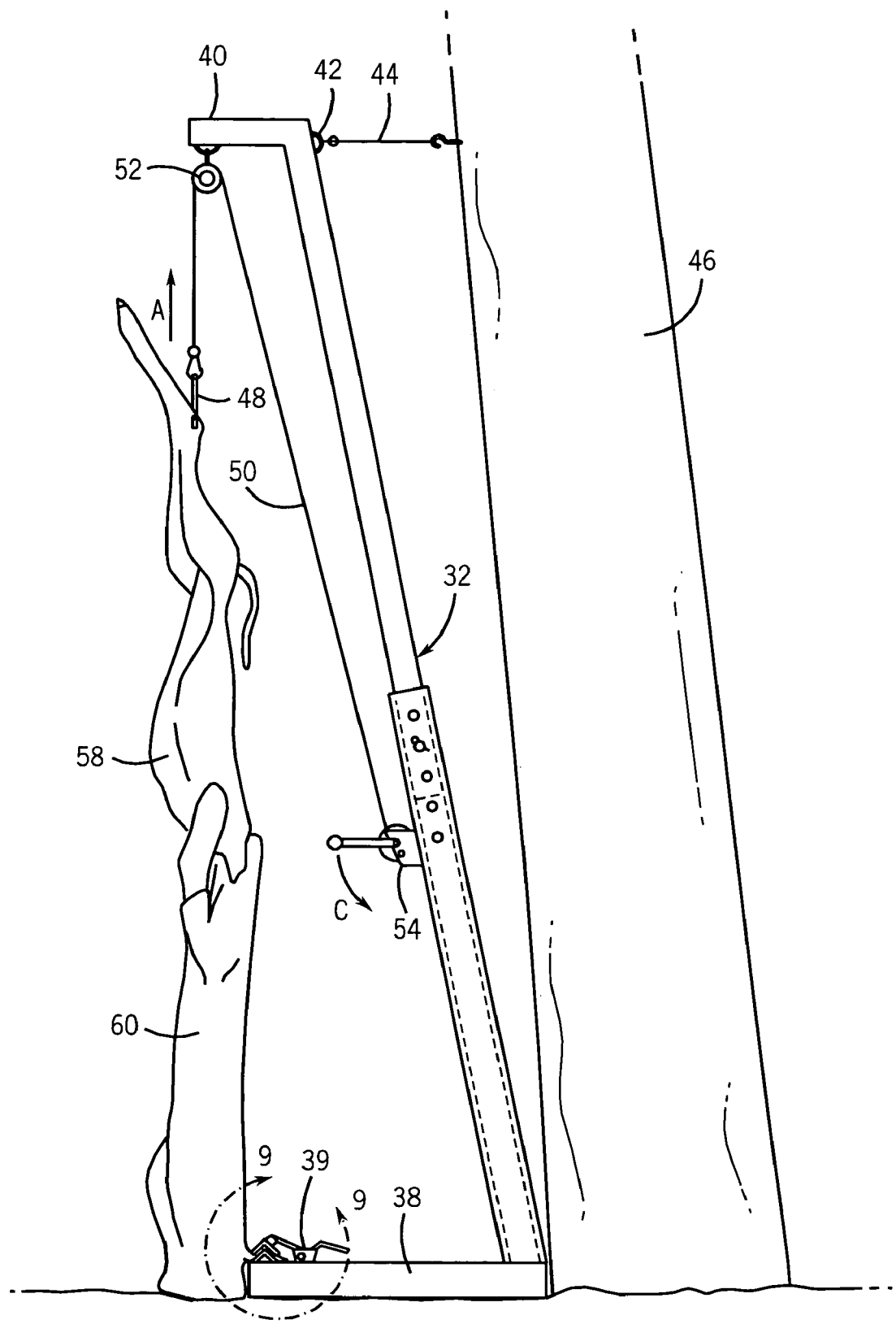
FIG. 7 is a side view of the animal skinner of FIG. 1 shown with a partially skinned animal attached thereto.
Figure 8:
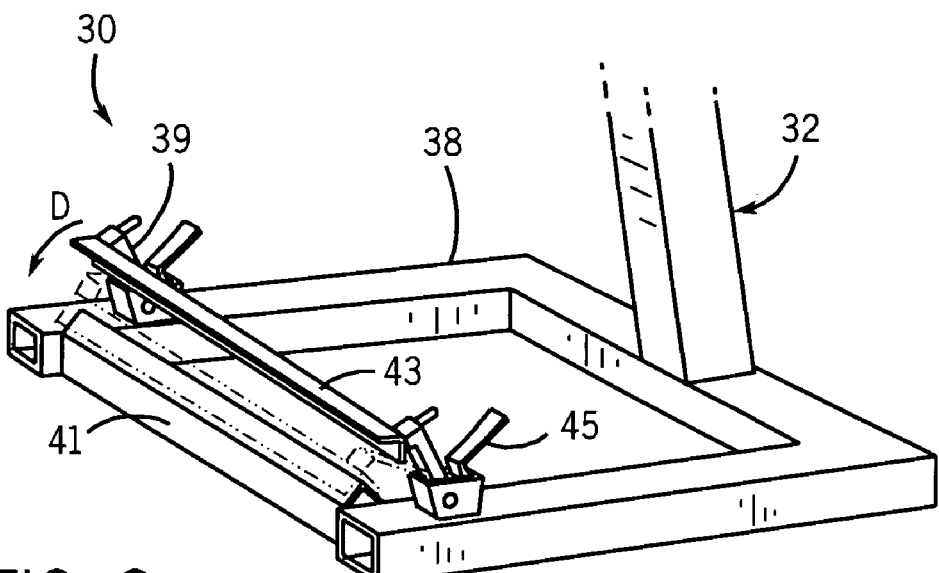
FIG. 8 is a perspective view of a portion of the animal skinner of FIG. 1.
Figure 9:
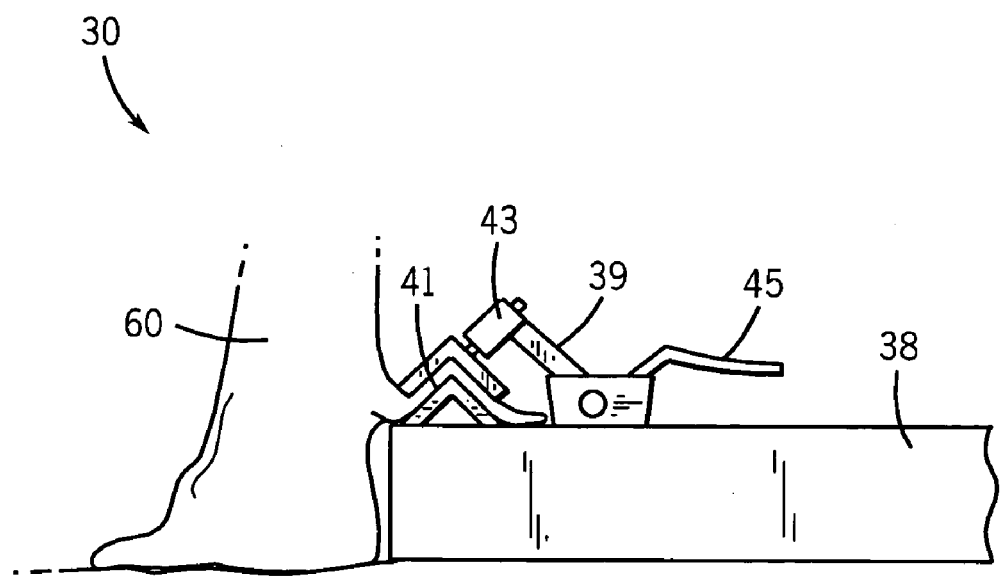
FIG. 9 is a side view of a portion of the animal skinner of FIG. 1 taken along the plane 9-9 in FIG. 7; and, FIG. 10 is a front view of the animal skinner of FIG. 1 shown with a skinned animal attached thereto and an individual preparing the animal.

In the embodiment shown in FIGS. 7-9, the skin retainer 39 is a clamp-like structure. The skin retainer 39 has at least one arm 41 or 43. In one embodiment shown in FIGS. 7-9, the skin retainer 39 has a clamp arm 43 and a clamp base 41. Clamp arm 43 and/or clamp base 43 may be formed as part of the base 38 or may be separate pieces attached to the base 38, ground, and/or other structures. Clamp base 41 is fixed relative to the base 38 and has an angled top surface. The clamp arm 43 is moveable relative to the base 38 and has an angled bottom surface. Moving clamp arm 43 in direction D clamps skin 60 between clamp base 41 and clamp arm 43 in the skin retainer 39. The angles of clamp arm 43 and clamp base 41 increase the friction there between, thus providing a more secure clamp. In one embodiment shown in FIGS. 7-9, the top surface of clamp base 41 and the bottom surface of clamp arm 43 are complimentarily angled so as to closely fit together. In one embodiment, clamp arm 43 is biased towards clamp base 41. Clamp arm 43 may be locked in an open position as shown in FIG. 9 and phantom in FIG. 8. Once released, clamp arm 43 travels toward clamp base 41. In the embodiment shown in FIGS. 8 and 9, clamp arm 43 is released by actuating latch 45. Alternatively, clamp arm 43 may be configured to be operated in the opposite manner. In this embodiment, clamp arm 43 is biased away from clamp base 41. Actuation of latch 45 causes clamp arm 43 to be forced against clamp base 41. Releasing latch 45 results in clamp arm 43 moving away from clamp base 41. In other embodiments, an operator physically moves clamp arm 43 from a locked to a released position and vice-versa. Of course, clamp arm 43 may be fixed and/or clamp base 41 may be moveable without departing from the invention.

As discussed above and shown in FIGS. 1 and 2, the animal skinner 30 has a support 32 attached to the base 38. The support 32 and the base 38 may be constructed of a single piece of material or separate pieces joined together. The support 32 may be constructed from any suitable material such as plastic, wood, or metal. In the embodiment shown in FIGS. 1 and 2, the height of the support 32 is adjustable, preferably in a telescoping manner. In one embodiment, the height of the animal skinner 30 is adjustable between about eight to about twelve feet. In one embodiment, the support 32 is constructed of a plurality of sections. In the embodiment shown in FIGS. 1 and 2, the support 32 is constructed of two separate sections, a lower section 36 and an upper section 34. The upper section 34 slides relative to the lower section 36. Both the lower section 36 and the upper section 34 have at least one hole 37 therein, and preferably a series of holes 37. A pin 35 is selectively positioned in the holes 37 to maintain the position of the upper section 34.

Figure 2:
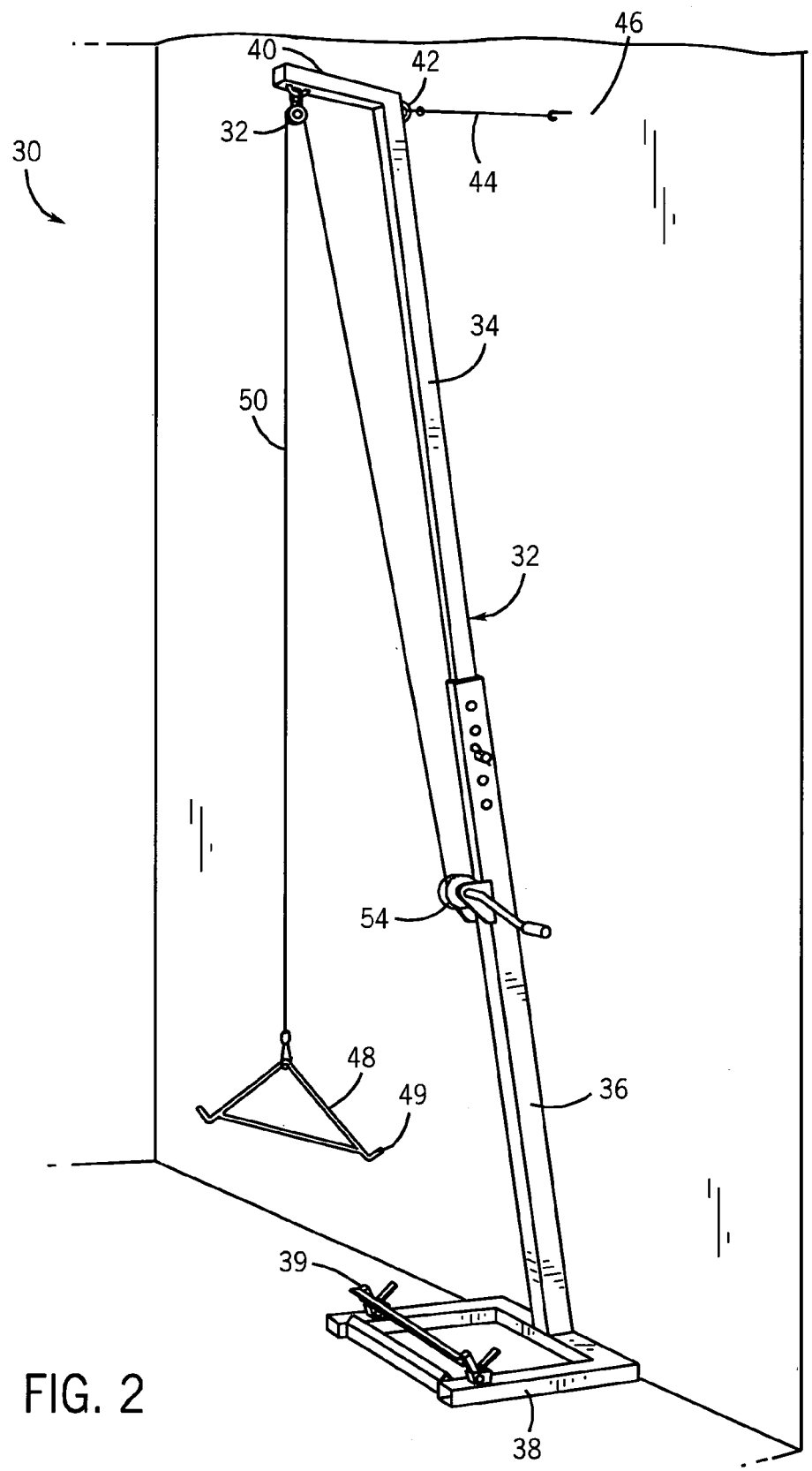
FIG. 2 is a perspective view of the animal skinner of FIG. 1 shown attached to a wall.

As shown in FIGS. 1 and 2, the support 32 has an arm 40. The arm 40 and the rest of the support 32 may be constructed of a single piece or separate pieces joined together. The arm 40 may be constructed from any suitable material such as plastic, wood, or metal. The arm 40 may be attached to any portion of the support 32 at a variety of angles depending on a number of characteristics such as size of the animal 58 to be skinned and the size of the base 38. In the embodiment shown in FIGS. 1 and 2, the arm 40 is substantially parallel to the base 38.

As shown in FIGS. 1 and 2, a crank 54 is positioned on the support 32. The crank 54 may be any structure capable of generating enough force to hoist an animal 58. The crank 54 may be manually operated or powered by an energy source such as solar, electric, gas, or the like. In the embodiment shown in FIGS. 1 and 2, the crank 54 is a winch. A hang line 50 is attached to the crank 54 at one end. The hang line 50 may be any suitable cord such as a cable, rope, chain, or the like. The hang line 50 passes through at least one hang line guide 52 attached to the arm 40. The number of hang line guides 52 attached to arm 40 may vary depending on the desired performance capabilities of the animal skinner 30. The hang line guide 52 and the arm 40 may be formed of the same piece or separate pieces joined together. The hang line guide 52 may be any structure that allows the hang line 50 to pass there through, over, and/or around. In one embodiment shown in FIGS. 1 and 2, the hang line guide 52 is a pulley. Alternatively, the hang line guide 52 may be a hook, loop, carabineer, clamp, or the like.

Figure 3:
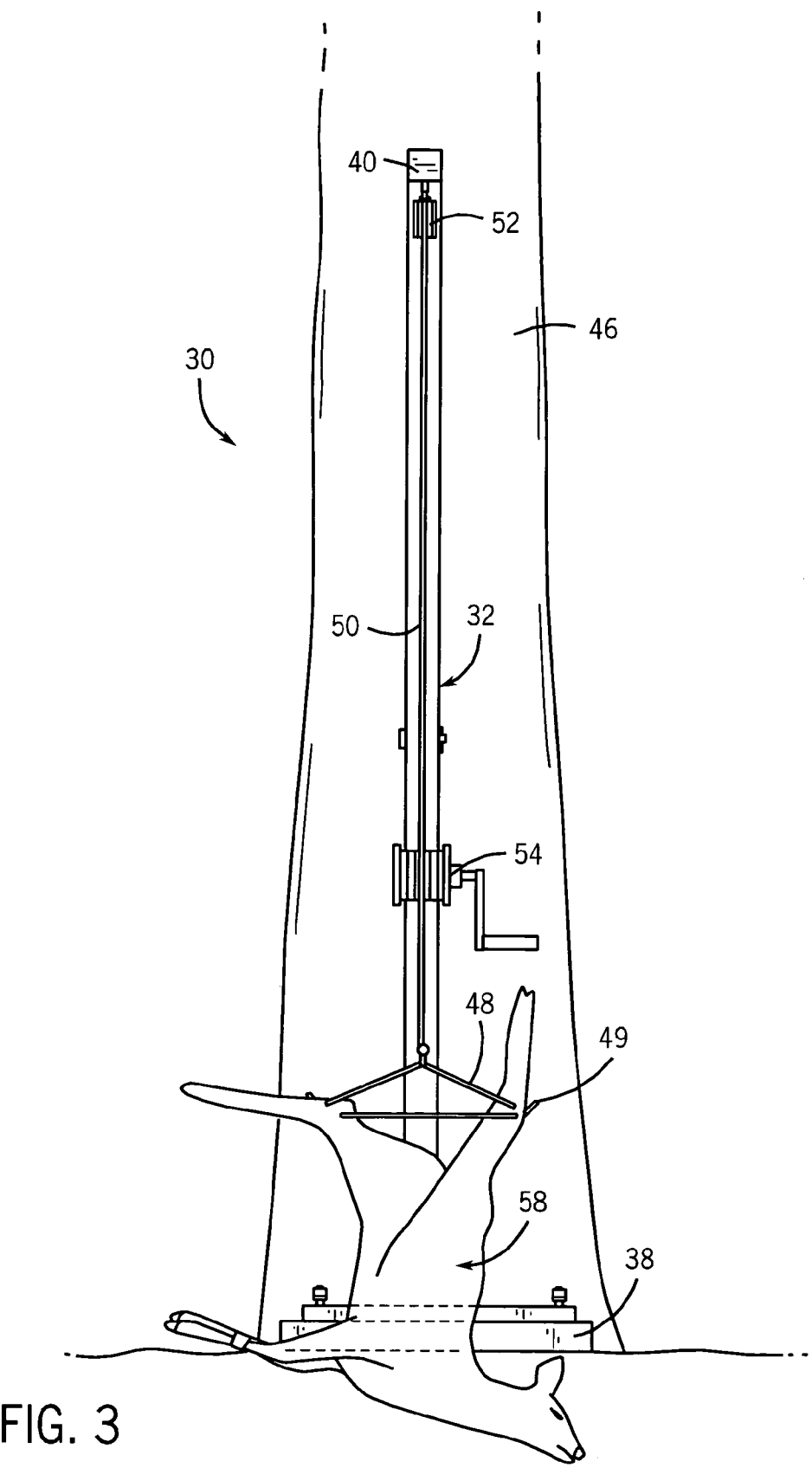
FIG. 3 is a front view of the animal skinner of FIG. 1 shown with an animal carcass attached thereto.

As shown in FIGS. 1 and 2, the other end of the hang line 50 is attached to an animal fastener 48, such as the gambrel shown. In one embodiment, the hang line 50 is attached to an intermediate device that is in turn attached to the animal fastener 48. Such an intermediate device may be a scale, tension adjuster, quick release mechanism, or device designed to allow the animal fastener 48 to rotate. The animal fastener 48 may be any structure capable of securely holding an animal 58 while the animal 58 is hoisted. In the embodiment shown in FIGS. 1 and 2, the animal fastener 48 is a gambrel with at least one hook 49. Portions of an animal 58 are placed on the hook 49. For example as shown in FIGS. 3 and 4, the hook 49 may be inserted into and/or through an animal's hind legs. Examples of other suitable animal fasteners 48 are disclosed in U.S. Pat. No. D312,388 to Riener; U.S. Pat. No. 4,909,555 to Blasi; U.S. Pat. No. D315,092 to Brown; U.S. Pat. No. 5,304,091 to Wilkinson; U.S. Pat. No. 5,288,265 to Beason et al.; U.S. Pat. No. 5,591,077 to Rowe; and U.S. Pat. No. 5,873,776 to Klepac, which are hereby incorporated by reference in their entireties for all purposes.

In the embodiment shown in FIGS. 1 and 2, the animal skinner 30 is attached to a brace 46. The brace 46 may be any structure able to help support the weight of the animal skinner 30 when an animal 58 is positioned thereon. For example as shown in FIG. 1, the brace 46 may be a tree. In another example shown in FIG. 2, the brace 46 may be a wall or a beam. Attachment to a brace 46 increases the stability of the animal skinner 30. In the embodiment shown in FIGS. 1 and 2, an attachment linkage 44 connects the brace 46 to an attachment point 42 on the animal skinner 30. The attachment linkage 44 may be any type of connector such as a chain, rope, bungee cord, cord, or the like. The attachment point 42 may be positioned anywhere on the animal skinner 30. In one embodiment shown in FIGS. 1 and 2, the attachment point 42 is positioned on the support 32. The attachment point 42 and the portion of the animal skinner 30 where it is positioned may be a single piece of separate pieces joined together. The attachment point 42 may be a hook, loop, carabineer, or other structure.

Figure 6:
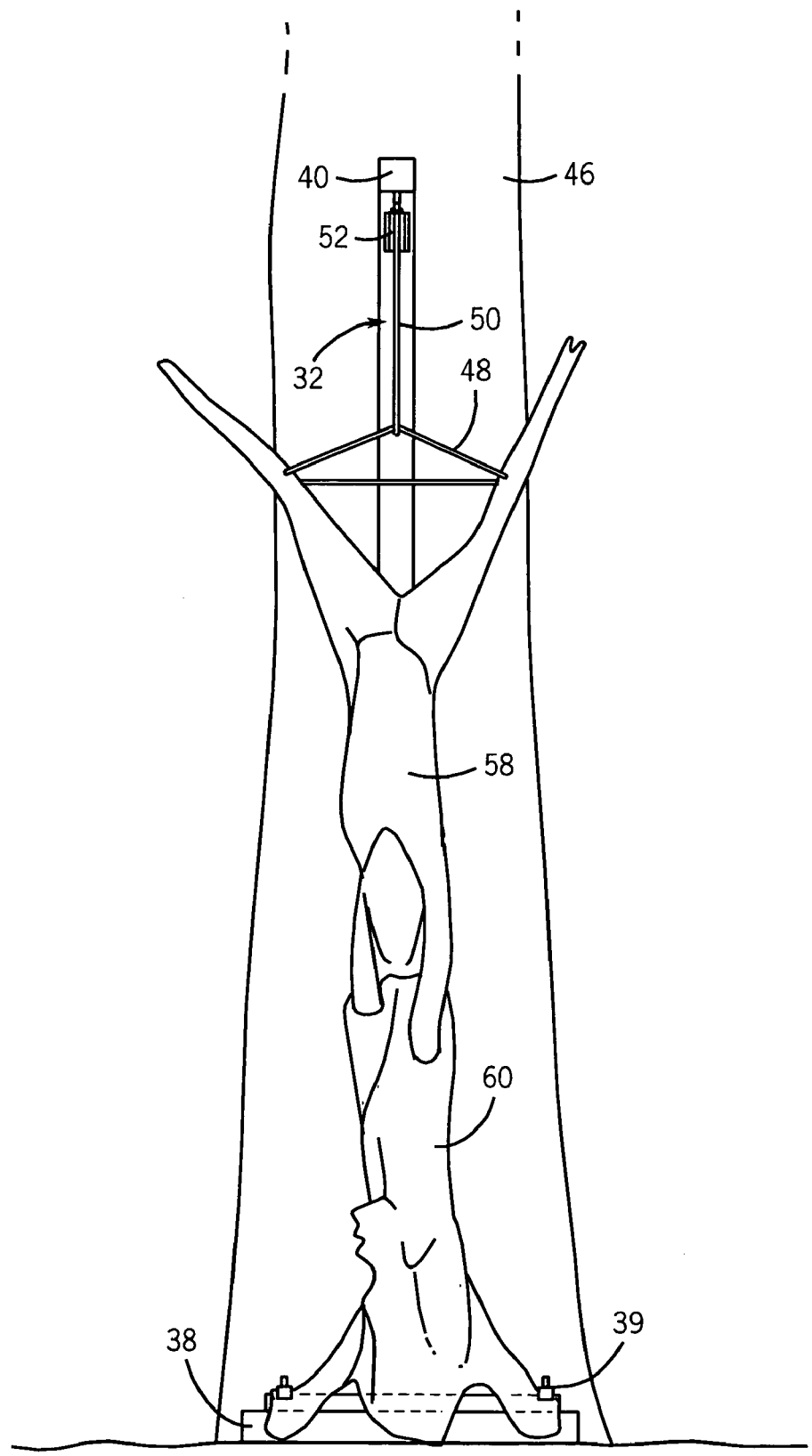
FIG. 6 is a front view of the animal skinner of FIG. 1 shown with a partially skinned animal attached thereto.
Figure 10:
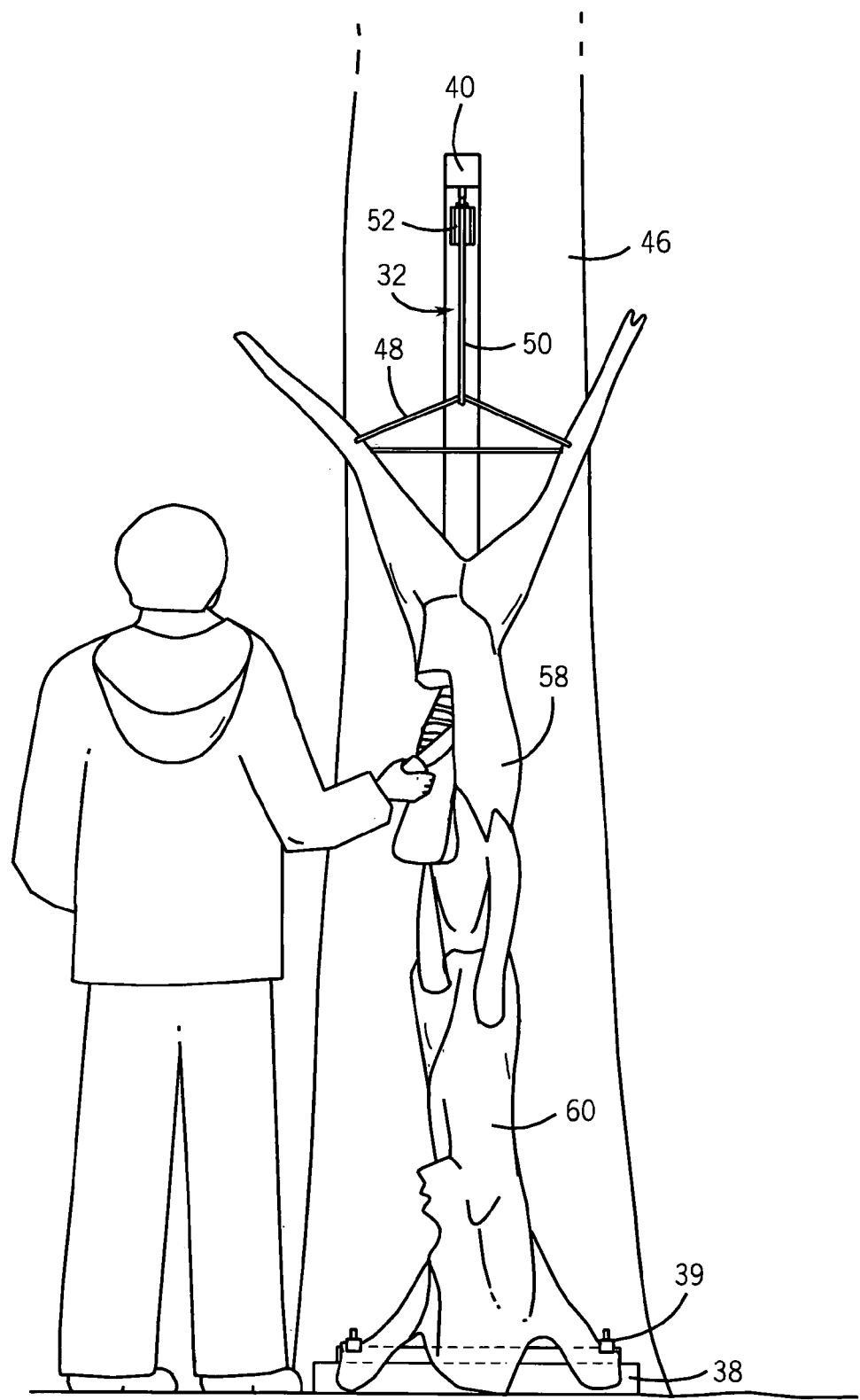

As discussed above, the animal skinner 30 can be used to skin a variety of animals. In operation as shown in FIG. 3, an animal 58 is attached to the animal fastener 48. The animal 58 is partially skinned so that a portion of the animal's skin 60 is free. In one embodiment, the animal 58 is partially skinned to below the point of attachment to the animal fastener 48. The animal 58 may be partially skinned prior to or after being attached to the animal fastener 48. The free portion of the animal's skin 60 is positioned in the skin retainer 39. The crank 54 is operated. As shown in FIG. 4, operation of the crank 54 winds the hang line 50 around a portion of the crank 54, thereby raising the animal fastener 48 and the animal 58 in direction A. The skin 60 remains positioned in the skin retainer 39. The result is that the animal skin 60 is pulled in direction B as shown in FIG. 4. As shown in FIGS. 5-7, continuing to operate the crank 54 further raises the animal in direction A, thereby essentially pulling the animal 58 out of its skin 60. After the animal 58 has been hoisted, the skin 60 may be fully removed from the animal 58 by freeing the skin 60 around the animal's arms and head or by severing the animal's arms and head from its body. The skin 60 can be discarded or saved for a variety of uses such as mounting, tanning, or clothing. As shown in FIG. 10, the animal 58 may be butchered, sectioned, or otherwise prepared while attached to the animal skinner 30.

The animal skinner 30 is transportable. The animal skinner 30 may be constructed of several small pieces that can be easily transported and assembled. In one embodiment, the animal skinner 30 can be assembled without the use of any tools. The animal skinner 30 may be used outdoors, such as during a hunt or in a backyard. The animal skinner may also be used indoors, such as in a garage or a shed.

The animal skinner and method of use of the present invention may have other applications aside from use in connection with skinning animals. Further, the invention may be implemented in a variety of configurations, using certain features or aspects of the several embodiments described herein and others known in the art. Thus, although the invention has been herein shown and described in what is perceived to be the most practical and preferred embodiments, it is to be understood that the invention is not intended to be limited to the specific features and embodiments set forth above. Rather, it is recognized that modifications may be made by one of skill in the art of the invention without departing from the spirit or intent of the invention and, therefore, the invention is to be taken as including all reasonable equivalents to the subject matter of the claims.

I claim:

1. An animal skinner consisting of:
    a base having a footprint with at least one skin retainer positioned thereon, the base configured to rest on a substantially horizontal surface;
    a support having a bottom portion connected to the base, and a top portion having an arm extending outwardly therefrom, the arm including a hang line guide;
    an attachment point positioned on the top portion of the support and extending in a direction substantially opposite of the arm, such that an attachment linkage can connect the attachment point to a brace;
    a crank positioned on the support; and,
    a hang line, the hang line connected to the crank at one end, passed through the hang line guide, and connected to an animal fastener at another end such that operation of the crank causes the animal fastener to move, the hang line positioned through the hang line guide such that when an animal is attached to the animal fastener and the skin retainer, the animal is positioned substantially outside of the footprint of the base.

2. The animal skinner of claim 1 wherein the support has a plurality of sections.

3. The animal skinner of claim 2 wherein the support is expandable in height.

4. The animal skinner of claim 1 wherein the skin retainer has a plurality of arms.

5. The animal skinner of claim 4 wherein at least one arm of the skin retainer is moveable relative to the base.

6. The animal skinner of claim 5 wherein movement of at least one moveable arm of the skin retainer is at least partially controlled by a latch.

7. The animal skinner of claim 4 wherein at least one arm of the skin retainer has an angled surface.

8. The animal skinner of claim 4 wherein the skin retainer has at least two arms with complementary angled surfaces.

9. The animal skinner of claim 1 wherein the arm on the support is substantially parallel to the base.

10. An animal skinner consisting of:
- a base having an enclosed footprint, with at least one skin retainer positioned thereon, the skin retainer having a clamp arm and a clamp base, at least one of the clamp arm and clamp base being moveable relative to the base;
- a support having a bottom connected to the base, and a top having an arm extending therefrom, the arm extending a distance beyond the enclosed footprint of the base and including a hang line guide;
- an attachment point positioned at the top of the support and extending in a direction opposite that of the support arm, where an attachment linkage connects the attachment point to a brace;
- a crank positioned on the support; and,
- a hang line, the hang line connected to the crank at one end, passed through the hang line guide, and connected to an animal fastener at another end such that operation of the crank causes the animal fastener to move, the hang line positioned through the hang line guide such that when an animal is attached to the animal fastener and the skin retainer, the animal is positioned substantially outside of the enclosed footprint of the base.

11. The animal skinner of claim 10 wherein the clamp arm and the clamp base of the skin retainer have complementary angled surfaces.

12. The animal skinner of claim 10 wherein movement of at least one moveable arm of the skin retainer is at least partially controlled by a latch.

13. The animal skinner of claim 10 wherein the arm of the support is substantially parallel to the base.

* * * * *